United States Patent
Choi et al.

(10) Patent No.: US 8,530,553 B2
(45) Date of Patent: Sep. 10, 2013

(54) BINDER COMPOSITION FOR SPRAY

(75) Inventors: Hyung Sek Choi, Gyeongsangnam-do (KR); Jong Pil Hwang, Gyeongsangnam-do (KR)

(73) Assignees: Daehyup Tech Co., Ltd (KR); Daehyup Spray Co., Ltd (KR); Hyung Sek Choi (KR)

( * ) Notice: Subject to any disclaimer, the term of this patent is extended or adjusted under 35 U.S.C. 154(b) by 703 days.

(21) Appl. No.: 12/721,150

(22) Filed: Mar. 10, 2010

(65) Prior Publication Data

US 2011/0021682 A1    Jan. 27, 2011

(30) Foreign Application Priority Data

Jul. 27, 2009    (KR) ........................ 10-2009-0068587

(51) Int. Cl.
*C08K 5/55*    (2006.01)
*A61K 31/74*    (2006.01)
*B29C 47/00*    (2006.01)

(52) U.S. Cl.
USPC ........................ 524/183; 424/78.31; 524/388

(58) Field of Classification Search
USPC ............ 524/183–185, 388; 424/78.31, 78.08
See application file for complete search history.

(56) References Cited

U.S. PATENT DOCUMENTS 4,442,252 A * 4/1984 Sumi et al. .................... 524/183
6,576,230 B1 * 6/2003 Xianbin et al. ............. 424/78.31

FOREIGN PATENT DOCUMENTS

WO    WO-99/66004 A1    12/1999

* cited by examiner

*Primary Examiner* — Liam Heincer
*Assistant Examiner* — Marilou Lacap
(74) *Attorney, Agent, or Firm* — Bill C. Panagos; Linda D. Kennedy; Butzel Long

(57) ABSTRACT

A binder composition for spray used for interior materials is disclosed to provide glass wool or rock wool with an adhesive force by simultaneously spraying two solutions onto the glass wool or rock wool so that the glass wool or rock wool is adhered to steel or concrete to enhance effects of heat insulation and sound insulation. The binder composition contains a first solution of 200 to 400 parts by weight consisting of polyvinyl alcohol, preservative, antifoaming agent and purified water, and a second solution of 100 parts by weight consisting of boric acid, basic compound, glycerin and purified water.

3 Claims, No Drawings

BINDER COMPOSITION FOR SPRAY

BACKGROUND OF THE INVENTION

1. Field of the Invention

The present invention relates to a binder composition for spray used for interior materials which can provide glass wool or rock wool with an adhesive force by simultaneously spraying two solutions onto the glass wool or rock wool so that the glass wool or rock wool is adhered to steel or concrete to enhance effects of heat insulation and sound insulation, and more particularly, to a binder composition containing a first solution of 200 to 400 parts by weight consisting of polyvinyl alcohol, preservative, antifoaming agent and purified water, and a second solution of 100 parts by weight consisting of boric acid, basic compound, glycerin and purified water.

2. Description of the Prior Art

Binders used in the past is a one-component solution consisting of pure water or polymer material, and is sprayed onto interior materials or steel under constant pressure to adhere the interior materials and steel.

However, the conventional one-component solution has problems in that the adhesive force is weak and its color and physical property are changed after the lapse of time. If the color and physical property are changed, the adhering surface between the interior materials and the steel is cracked so that the interior materials are likely detached from the steel.

Consequently, there is needed a binder composition for spray which can exhibit a strong adhesive force even with small quantities through chemical binding which happens by spray of two-component solution, and can prevent discoloration and maintain a physical property for a long time.

SUMMARY OF THE INVENTION

Accordingly, the present invention has been made to solve the above-mentioned problems occurring in the prior art, and an object of the present invention is to provide a binder composition for spray which can provide glass wool or rock wool with an excellent adhesive force by simultaneously spraying small quantities of two-component solutions which causes strong chemical binding.

Another object of the present invention is to provide a binder composition for spray which can prevent a physical property from being deteriorated from a long time by strong chemical binding generated immediately after two-component solutions are sprayed.

In order to accomplish these objects, according to one aspect of the present invention, there is provided a binder composition containing a first solution of 200 to 400 parts by weight consisting of polyvinyl alcohol, preservative, antifoaming agent and purified water, and a second solution of 100 parts by weight consisting of boric acid, basic compound, glycerin and purified water.

According to a preferred feature of the present invention, the first solution consists of the polyvinyl alcohol of 1 to 30 parts by weight, the preservative of 0.01 to 5 parts by weight, the antifoaming agent of 0.05 to 5 parts by weight, and the purified water of 70 to 99 parts by weight.

The preservative contains 5-chloro-2-methyl-4-isothiazoline-3-one and 2-methyl-4-isothiazoline-3-one.

According to a preferred feature of the present invention, the second solution consists of the boric acid 1 to 30 parts by weight, the basic compound of 0.1 to 10 parts by weight, the glycerin of 0.5 to 10 parts by weight and the purified water of 70 to 99 parts by weight.

The antifoaming agent is mixed with polyethylene glycol which is a nonionic surfactant, and purified water.

The basic compound consists of potassium hydroxide of 0.1 to 10 parts by weight or sodium hydroxide of 01 to 10 parts by weight.

Since the binder composition for spray according to the present invention is fabricated by two-component solution, the glass wool or rock wool is provided with an excellent adhesive force by simultaneously spraying small quantities of two-component solutions which causes strong chemical binding.

Further, since the strong chemical binding is generated immediately after two-component solutions are sprayed, the physical property can be maintained for a long time.

DETAILED DESCRIPTION OF THE PREFERRED EMBODIMENTS

Hereinafter, preferred embodiments of the present invention will be described with reference to the accompanying drawings. In the following description and drawings, the same reference numerals are used to designate the same or similar components, and so repetition of the description on the same or similar components will be omitted.

A binder composition for spray according to the present invention contains a first solution of 200 to 400 parts by weight consisting of polyvinyl alcohol, preservative, antifoaming agent and purified water, and a second solution of 100 parts by weight consisting of boric acid, basic compound, glycerin and purified water.

The first solution consists of the polyvinyl alcohol of 1 to 30 parts by weight, the preservative of 0.01 to 5 parts by weight, the antifoaming agent of 0.05 to 5 parts by weight, and the purified water of 70 to 99 parts by weight.

The preservative contains 5-chloro-2-methyl-4-isothiazoline-3-one and 2-methyl-4-isothiazoline-3-one.

The polyvinyl alcohol is cross-linked with borate ion generated through reaction between the boric acid and the basic compound which are contained in the second solution in polymer chains, so that the binder has a stable physical property for a long time.

In this instance, the antifoaming agent is mixed with polyethylene glycol which is a nonionic surfactant, and purified water. When the first solution is mixed, the antifoaming agent has a role of removing foams generated in the process of adding the purified water into the first solution.

The second solution consists of the boric acid 1 to 30 parts by weight, the basic compound of 0.1 to 10 parts by weight, the glycerin of 0.5 to 10 parts by weight and the purified water of 70 to 99 parts by weight.

If the boric acid is dissolved in the purified water, a borate solution becomes an alkaline solution of pH 9. Since the borate solution is not fully reacted with the polyvinyl alcohol, the pH of the borate solution is adjusted by adding the basic compound such as potassium hydroxide or sodium hydroxide, and thus is induced in a type of a borate ion which can fully react with the polyvinyl alcohol.

The glycerin of 0.5 to 10 parts by weight is added to increase the adhesive force of the binder composition for spray and thus prevent the binder composition from flowing down from the sprayed portion.

According to the binder composition for spray consisted of the above-described components, two solutions are simultaneously sprayed onto the glass wool or rock wool to provide the glass wool or the rock wool with the adhesive force so that the glass wool or rock wool can be adhered to steel or concrete.

A method of fabricating the binder composition for spray according to the present invention and the physical property will be described with reference to embodiments.

Polyvinyl alcohol of 5 parts by weight, preservative of 0.05 parts by weight containing 5-chloro-2-methyl-4-isothiazoline-3-one and 2-methyl-4-isothiazoline-3-one, antifoaming agent of 0.1 parts by weight which consists of polyethylene glycol and purified water, and purified water of 94.85 parts by weight are mixed to fabricate the first solution.

Boric acid 3 parts by weight, basic compound of 0.5 parts by weight, glycerin of 1 part by weight and purified water of 95.5 parts by weight are mixed to fabricate the second solution.

Embodiment 1

In a spray device including a plurality of spray nozzles, each of the spray nozzles was supplied with the first solution of 200 parts by weight and the second solution of 100 parts by weight. Glass wool filled in other nozzles was sprayed together with the first solution and the second solution onto a surface of steel, and then they were dried during 28 days.

Embodiment 2

In a spray device including a plurality of spray nozzles, each of the spray nozzles was supplied with the first solution of 300 parts by weight and the second solution of 100 parts by weight. Glass wool filled in other nozzles was sprayed together with the first solution and the second solution onto a surface of steel, and then they were dried during 28 days.

Embodiment 3

In a spray device including a plurality of spray nozzles, each of the spray nozzles was supplied with the first solution of 400 parts by weight and the second solution of 100 parts by weight. Glass wool filled in other nozzles was sprayed together with the first solution and the second solution onto a surface of steel, and then they were dried during 28 days.

Comparative Embodiment

A mixture of a binder of 100 parts by weight consisting of vinyl acetate and purified water of 800 parts by weight was sprayed onto a surface of steel together with powder of glass fiber, and then they were dried during 28 days.

The adhesive forces between the glass wool and the steel which are sprayed by two-component binder are measured and shown in Table 1 below through Embodiments 1 to 3 and Comparative Embodiment.

According to a measuring method, a cap with a ring is adhered to the surface of the glass wool, which is adhered to the surface of the steel by the two-component solution, by using a urethane adhesive, and then is completely cured.

If the urethane adhesive is cured, the ring of the cap is caught by a spring balance, and then the spring balance is pulled in a direction perpendicular to the surface of the cap until the glass wool is detached from the steel, thereby measuring the maximum load.

The adhesive force is calculated by the following equation. The adhesive force is obtained from three arbitrary portions of the glass wool adhered to the surface of the steel, and a mean value is obtained from three adhesive forces.

Adhesive force=maximum load (kg)/sectional area ($m^2$) of cap adhered to surface of glass wool

TABLE 1

|  | Adhesive force ($kg/m^2$) |
|---|---|
| Embodiment 1 | 4.65 |
| Embodiment 2 | 9.39 |
| Embodiment 3 | 5.32 |
| Comparative Embodiment | 1.35 |

It would be, understood from Table 1 that the binder composition for spray fabricated by the invention is strongly adhered to the surface of the steel and the glass wool by spraying the composition onto the glass wool.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A binder composition for spray comprising: a first solution of 200 to 400 parts by weight consisting of polyvinyl alcohol, preservative, antifoaming agent and purified water; and a second solution of 100 parts by weight consisting of boric acid, basic compound, glycerin and purified water; said second solution consisting of the boric acid 1 to 30 parts by weight, the basic compound of 0.1 to 10 parts by weight, the glycerin of 0.5 to 10 parts by weight and the purified water of 70 to 99 parts by weight; said basic compound consisting of potassium hydroxide of 0.1 to 10 parts by weight or sodium hydroxide of 0.1 to 10 parts by weight.

2. The binder composition according to claim 1, wherein the preservative contains 5-chloro-2-methyl-4-isothiazoline-3-one and 2-methyl-4-isothiazoline-3-one.

3. The binder composition according to claim 1, wherein the antifoaming agent is mixed with polyethylene glycol which is a nonionic surfactant, and purified water.

* * * * *